March 20, 1962   M. J. GIELEGHEM   3,025,897
SNAP-IN TYPE CAGED NUTS
Filed Jan. 12, 1959

INVENTOR.
MAURICE J. GIELEGHEM
BY Whittemore,
Hulbert & Belknap
ATTORNEYS

United States Patent Office 3,025,897
Patented Mar. 20, 1962

3,025,897
SNAP-IN TYPE CAGED NUTS
Maurice J. Gieleghem, 17311 Plainview, Detroit, Mich.
Filed Jan. 12, 1959, Ser. No. 786,352
2 Claims. (Cl. 151—41.74)

The present invention relates to snap-in type caged nuts.

It is an object of the present invention to provide snap-in type caged nuts characterized by the positive nature of the interlock when the nut cage is pressed into the opening.

It is a further object of the present invention to provide a snap-in type caged nut characterized by its ability to resist being drifted out of the opening by insertion of the bolt in the nut.

More specifically, it is an object of the present invention to provide a snap-in type caged nut in which the cage includes two oppositely disposed side portions interconnected by bowed strips adapted to be straightened to cause the side portions to move apart and so to engage opposite side portions of an opening in a panel part.

Other objects and features of the invention will become apparent as the description proceeds, especially when taken in conjunction with the accompanying drawings, illustrating a preferred embodiment of the invention, wherein.

Figure 2:
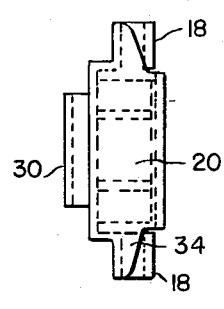
FIGURE 2 is a side elevation of the nut.

Caged nuts of the type described are intended to be locked into an opening in a panel part for subsequent assembly. It is an essential requirement of such nuts that they be firmly retained in the opening against the possibility of accidental dislodgment. This is particularly true because the utility of such caged nuts is primarily in assembly operations in which the nut may be inaccessible during final assembly.

For similar reasons it is essential that the caged nut assembly be constructed and arranged to prevent being drifted out of the opening as a bolt is tightened in the nut.

In accordance with the present invention the nut, indicated at 10, may be a conventional square nut having the usual tapped opening 12. The cage is formed of a single piece of metal appropriately cut and shaped to the required outline. As indicated in the figures, the nut cage comprises opposed side portions indicated at 14 and 16, these side portions being interconnected solely by bent strips 18 disposed at opposite ends of the cage. Each side portion of the nut includes a vertically extending wall 20 terminating at its upper edge in inwardly extending flanges 22 which may be provided with arcuate recesses 24 substantially concentric with the threaded opening 12 in the nut 10.

At the bottoms of the side walls 20, the nut cage is provided with inwardly extending portions 26 on which the nut 10 is adapted to rest. Preferably, the forming operation is one in which short end wall sections 28 result which also serve as partial locators for the nut 10. Extending downwardly from the inwardly extending portions 26 are the reversely bent hook portions 30 adapted to engage beneath the edges 32 surrounding the opening in a panel P to which the nut is to be assembled.

The bowed strips 18, as best seen in FIGURE 2, are interconnected to the side walls 20 by end extensions 34 coplanar with the side walls 20.

Figure 3:
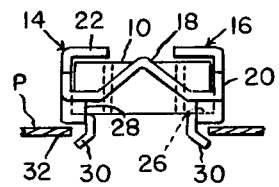
FIGURE 3 is a front elevation of the nut.

In practice, the cage with the nut retained therein is assembled in the opening in the panel P as illustrated in FIGURE 3. It will be appreciated that this is accomplished by engaging one hook portion 30 with one side of the opening and swinging the nut cage down so that the other hook engages in the opening. At this time the opposite side walls 20 of the cage are in substantial engagement with opposite sides of the nut body 10. Pressure is applied to straighten out the bent or bowed strips 18 to the position illustrated in FIGURE 4, which will have the effect of forcing the opposite side portions 14 and 16 apart so as to engage the hook portions 30 firmly with the edge portions 32 of the panel P. It will further be observed that the straightened strips 18 are located closely adjacent to the plane of the panel and thus constitute relatively strong struts adapted to prevent drifting the cage assembly out of the opening by torque applied to the cage assembly through a bolt.

The strips 18 when straightened occupy a position between the planes defined by the ends of the nut 10. As a result, the strips prevent the side portions of the cage from spreading, as might occur if the strips were below the bottom of the nut. The strips oppose spreading of the side portions by tension and are thus adapted to oppose stronger forces than if spreading were opposed by bending.

Forces tending to spread the opposite sides of the cage may result from a tight thread nut.

Figure 1:
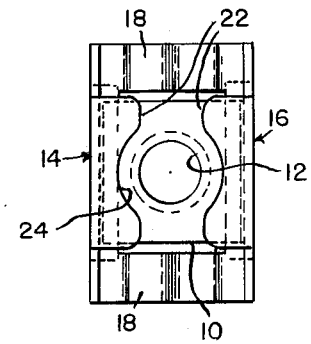
FIGURE 1 is a plan view of the snap-in type caged nut.
Figure 4:
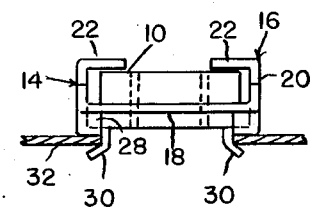
FIGURE 4 is a view similar to FIGURE 3 showing the cage expanded to lock the nut assembly in a panel part.

When the opposite side portions 14 and 16 have been separated to the position illustrated in FIGURE 4, it will be observed that clearance is introduced between the side walls 20 and the sides of the nut, thus introducing some freedom of movement of the nut. In addition, the hollow corner portions provided by the internal intersection of the side walls 20, the portions 26 and the portions 28 are located so as to provide some freedom of movement of the nut longitudinally, or vertically as seen in FIGURE 1. Thus, while the nut is not substantially free for movement prior to interlocking of the cage in the panel opening, as soon as the sides of the nut have been spread apart to interlock the cage in the opening, the nut is provided limited floating movement in a plane parallel to the plane of the panel P. A special tool may if desired be provided for straightening out the bent strips 18, but if preferred these strips may be substantially straightened by merely applying pressure to the intermediate portion. At this time the cage rests upon the edge portions of the panel surrounding the opening and the bent strips 18 overlie solid portions of the panel at the ends of the opening so that if bent down, even to a point where they contact the upper surface of the panel, the result will be a firm interlocking of the cage with the panel.

The drawings and the foregoing specification constitute a description of the improved snap-in type caged nuts in such full, clear, concise and exact terms as to enable any person skilled in the art to practice the invention, the scope of which is indicated by the appended claims.

What I claim as my invention is:

1. A caged fastener assembly comprising a fastener having a polygonal body portion, an integral sheet metal cage, said cage comprising opposed flat side walls disposed to extend parallel in proximity to opposite parallel edges of the fastener body portion and having flat coplanar end portions extending beyond the adjacent edges of said body portion, inwardly turned flanges at the tops of the intermediate portions of said side walls overlying the top surface of said body portion, inwardly turned shoulders at the bottoms of the intermediate portion of said side walls to underlie the bottom portion of said body portion, downwardly extending outwardly directed hooks at the inner edge of said shoulders to engage opposite edges of an opening in a panel part to which the fastener is to be attached, and transversely flat, longitudinally upwardly bowed strips connecting the end portions of said side walls and constituting the sole connection therebetween, whereby application of pressure to said bowed strips to straighten them moves said hooks into engagement with the edges of the opening when the assembly is positioned with said hooks in the opening, the bowed strips being formed to have end portions thereof connected to said shoulders by end wall portions extending upwardly from the plane of said shoulders, said strips being of a length such that they assume straight line condition in spreading the opposite side portions of said cage apart.

2. A caged fastener assembly comprising a fastener having a polygonal body portion, an integral sheet metal cage, said cage comprising opposed flat side walls disposed to extend parallel in proximity to opposite parallel edges of the fastener body portion and having flat coplanar end portions extending beyond the adjacent edges of said body portion, inwardly turned flanges at the tops of the intermediate portions of said side walls overlying the top surface of said body portion, inwardly turned shoulders at the bottom of the intermediate portion of said walls to underlie the bottom portion of the body portion, downwardly extending outwardly directed hooks at the inner edge of said shoulders to engage opposite edges of an opening in a panel part to which the fastener is to be attached, and transversely flat, bowed strips connecting the extending end portions of said side walls, said strips being integral with and being bent upwardly along the lower edges of said extending end portions of said side walls, the edges of said extending end portions and said bowed strips normal to said lower edges being disposed substantially in the same plane, said strips constituting the sole connection between said side walls, whereby application of pressure to said bowed strips to straighten them moves said hooks into engagement with the edges of the opening when the assembly is positioned with said hooks in the opening, said strips being of a length such that they assume straight line condition in spreading the opposite side portions of said cage apart.

References Cited in the file of this patent

UNITED STATES PATENTS

| | | |
|---|---|---|
| 2,079,918 | Mitchel | May 11, 1937 |
| 2,585,728 | Bedford | Feb. 12, 1952 |
| 2,611,166 | Wiley | Sept. 23, 1952 |